Mar. 27, 1923.

W. A. STEPHENSON

ANIMAL SHEARING PLANT

Filed Nov. 17, 1919

Inventor-
William Acy Stephenson,
By- B. Singer,
Atty.

Mar. 27, 1923.
W. A. STEPHENSON
ANIMAL SHEARING PLANT
Filed Nov. 17, 1919
1,449,561
2 sheets-sheet 2
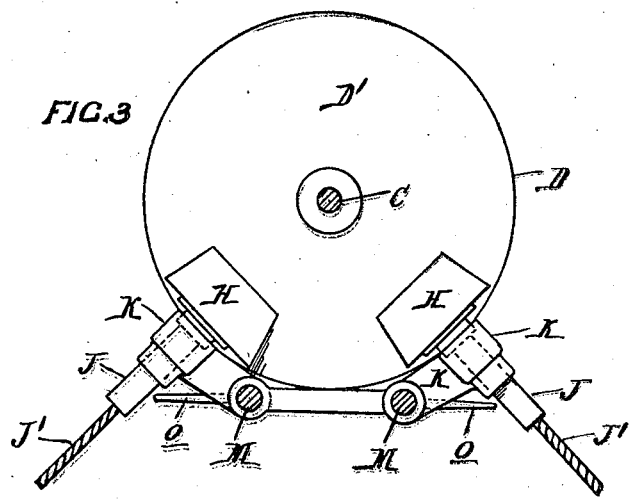
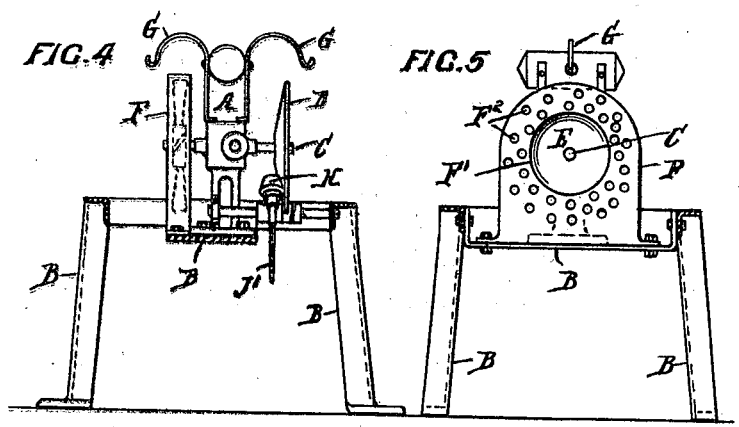
Inventor-
William Acey Stephenson
By- B. Singer, Atty Patented Mar. 27, 1923.

1,449,561

UNITED STATES PATENT OFFICE.

WILLIAM ACEY STEPHENSON, OF AUCKLAND, NEW ZEALAND.

ANIMAL-SHEARING PLANT.

Application filed November 17, 1919. Serial No. 338,692.

*To all whom it may concern:*

Be it known that I, WILLIAM ACEY STEPHENSON, subject of the King of Great Britain, residing at New North Road, Mount Albert, Auckland, New Zealand, have invented new and useful Improvements in or Relating to Animal-Shearing Plants; and I do hereby declare the following to be a full, clear, and exact description of the same.

This invention has been devised with the object of providing a simple portable power shearing plant that may be moved about from place to place for use.

The invention consists in a suitable form of high speed engine (preferably an internal combustion engine) that is mounted on a frame that in turn is supported by a transporting platform. The said engine is furnished with one or two fly wheels and each of such fly wheels is made with one side bevelled that makes frictional driving contact with a friction cone that is mounted in a bearing, and the spindle of which is attached to the usual flexible shafting drive for the shear or shears. These may be geared in the well known principle providing for them being thrown in or out of gear when required.

The fly wheels are also so shaped that suitable parts of their outside faces may be used for grinding the shear combs and cutters, such parts being covered with emery or other grinding material.

The whole of the machinery is thus combined into one unit capable of being moved from place to place as required.

Provision is made for cooling the engine, as for instance by means of an air fan driven by it.

A suitable application of the invention is shewn in the accompanying drawings in which is illustrated a self contained plant adapted to operate two shears and having an air cooled engine.

In such drawings:—

Figure 3 is a cross section on the line 3—3 of Figure 1 and looking to the right of such line.

Figure 4 is a side elevation, on a smaller scale, of the complete apparatus, the supporting frame being shewn in section.

Figure 5 is a back end elevation thereof, in this view also the supporting frame being shewn in section.

Figure 1:
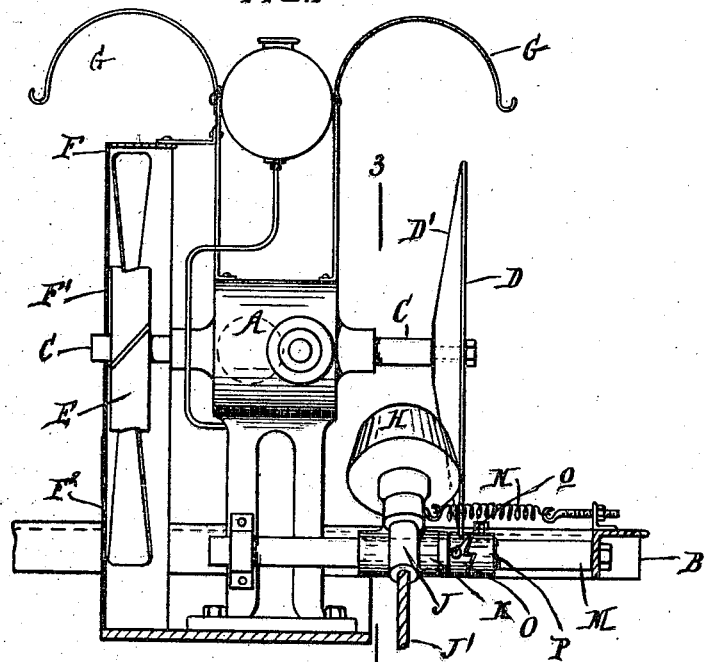
Figure 1 is a side elevation of the operative portions of the apparatus, certain parts being shewn in section.
Figure 2:
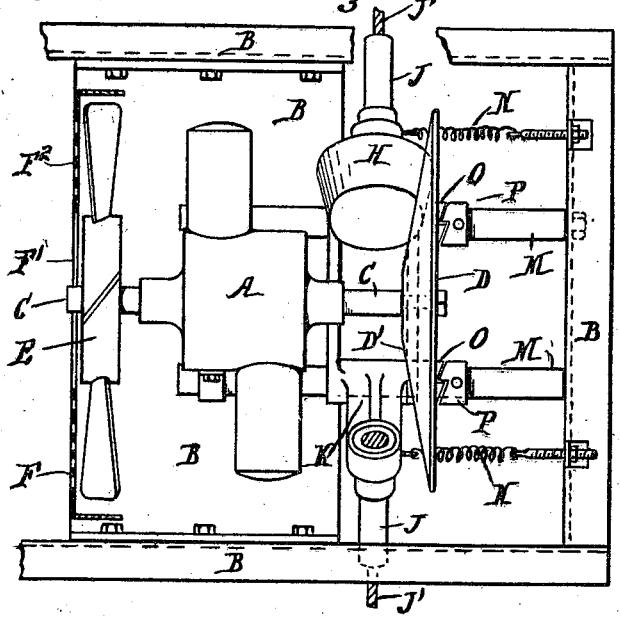
Figure 2 is a plan thereof, one of the friction cones being removed to clearly show the parts beneath.

It is to be understood that the details of construction of the various parts shewn in the drawings and whose functions are herein described, may be varied in different ways without altering their purposes and without departing from the main objects of the invention.

In carrying out the invention, an engine A is provided and mounted upon a transportable framework B of any suitable size and design. The engine is preferably of the internal combustion type and its various usual adjuncts, such as oil fuel tank, carburettor magneto, silencer etc. are also all mounted on the framework.

The main crank shaft C of the engine is arranged to extend longitudinally with the frame and upon it, in the example shewn in the drawings, at one end is fixed a friction driving wheel D and at the other a combined fly wheel and air fan E, which in the running of the engine, is designed to keep the engine cylinders cool. The friction driving wheel D is formed on its inside surface with a bevelled contact face D′ and its outer face is formed with a grinding surface in any convenient manner such as by the adhesion thereto of emery, carborundum or the like. Similarly the outer face of the central boss of the flywheel E is made as a grinding surface. This flywheel is preferably enclosed within a metal guard F fixed to the framing B and having a central opening F′ to leave the grinding face of the flywheel exposed, and with perforations $F^2$ to allow of the supply of air to the fan for the cooling of the engine. Arranged above the grinding means thus provided at each end of the engine, is a hook fixture G that may be employed for the suspension thereon on the articles being ground.

Combined with the friction driving wheel D are the two friction cones H. These are arranged on respectively opposite sides of the crank shaft C and each one is attached to a short bearing spindle J that at its other end is made fast to an ordinary flexible driving shaft J′. The spindle J is journalled in a bracket bearing K that is carried on a fixed bar M extending longitudinally in the frame B so as to position its cone H upon the inside of the driving wheel D and in such a position as to engage the driving face D' of such wheel. The angle of inclination of this face and also of the cone's periphery is such that the whole width of such periphery will engage the surface of the wheel when the cone is moved into contact with such surface. The bearing K is slidably mounted on the bar M and it is so shaped that the spindle J is held therein in a line radial with the engine crank shaft C, as shewn particularly in Figure 3. The flexible driving shafts J' of the two cones therefore extend outwards and downwards from opposite sides of the machine so that each may be used for operating machine sheep shears or other appliances in the well known manner.

Suitable means are provided whereby the bearings K may be moved back or forth along their respective bars M in order to put the cones out of or into driving contact with the wheel D. These may be of any approved nature. In the drawings the means shewn consist in a spring N that normally draws the bearing towards the wheel D, and a pair of collars O—P mounted on the bar alongside the outer end of the bearing. The inner of these collars O is loose on the bar and is made capable of rotation thereon, while the other is fixed on the bar. The adjacent faces of the two collars are made with engaging ratchet surfaces so that the partial rotation of the loose collar O in one direction will move it laterally away from the fixed collar and by its wedging action between the bearing K and the fixed collar P will move such bearing back along the bar and free the cone carried therein from the driving shaft. The release of the loose collar, or its turning in the reverse direction, will then allow the spring N to draw the bearing and cone out to their normal positions. The collar O is provided with a handle o for use in turning it.

If desired, the driving wheel and cones may be duplicated upon the other end of the machine so that four shears may be driven by the apparatus.

I claim:—

In combination, a portable stand, a motor engine mounted upon such stand, a driving shaft actuated by such engine, a driving wheel mounted on the shaft constructed on one face with a frictional engaging surface, a fixed bar on said stand and parallel with said shaft, a bearing slidably mounted on the said bar adjacent to the frictional surface of the driving wheel, and arranged to be moved to and fro in relation to the said surface, a friction cone, a bearing spindle attached to such cone and journaled in the said bearing, a flexible driving shaft connected to the said bearing spindle, and yieldable means active to normally hold the bearing in the required position to keep said cone in contact with said frictional engaging surface.

In testimony whereof, I have signed this specification in the presence of two subscribing witnesses.

WILLIAM ACEY STEPHENSON.

Witnesses:
  DAVID BROWN HULTON.
  WALTER ALEXANDER.